US011659322B1

(12) United States Patent
Woodworth et al.

(10) Patent No.: US 11,659,322 B1
(45) Date of Patent: May 23, 2023

(54) AUDIO BASED AIRCRAFT DETECTION

(71) Applicant: Wing Aviation LLC, Mountain View, CA (US)

(72) Inventors: Adam Woodworth, Mountain View, CA (US); Jacob Huffman, Mountain View, CA (US); Jeremy Chalmer, Mountain View, CA (US)

(73) Assignee: WING AVIATION LLC, Mountain View, CA (US)

( * ) Notice: Subject to any disclaimer, the term of this patent is extended or adjusted under 35 U.S.C. 154(b) by 443 days.

(21) Appl. No.: 16/830,508

(22) Filed: Mar. 26, 2020

Related U.S. Application Data

(63) Continuation of application No. 15/632,745, filed on Jun. 26, 2017, now abandoned.

(51) Int. Cl.
| | | |
|---|---|---|
| H04R 1/40 | (2006.01) | |
| B64C 39/02 | (2023.01) | |
| B64D 45/00 | (2006.01) | |
| G05D 1/00 | (2006.01) | |
| G08G 5/04 | (2006.01) | |
| H04R 1/02 | (2006.01) | |
| G10K 11/178 | (2006.01) | |
| H04R 3/00 | (2006.01) | |

(52) U.S. Cl.
CPC .......... *H04R 1/406* (2013.01); *B64C 39/024* (2013.01); *B64D 45/00* (2013.01); *G05D 1/0022* (2013.01); *G08G 5/045* (2013.01); *G10K 11/178* (2013.01); *H04R 1/028* (2013.01); *H04R 3/005* (2013.01); *B64C 2201/146* (2013.01); *B64D 2045/0085* (2013.01); *G10K 2210/1281* (2013.01); *H04R 2499/13* (2013.01)

(58) Field of Classification Search
CPC . B64C 39/024; B64C 2201/146; B64D 45/00; B64D 2045/0085; G05D 1/0022; G08G 5/045; H04R 1/406; H04R 1/028; H04R 3/005; H04R 2499/13; G10K 11/178; G10K 2210/1281
See application file for complete search history.

(56) References Cited

U.S. PATENT DOCUMENTS

| | | | |
|---|---|---|---|
| 5,774,557 A * | 6/1998 | Slater | H04R 3/005 381/56 |
| 6,314,366 B1 | 11/2001 | Farmakis et al. | |
| 6,636,609 B1 | 10/2003 | Ha et al. | |
| 6,707,052 B1 | 3/2004 | Wild et al. | |
| 7,383,106 B1 * | 6/2008 | Coonse, Jr. | G10K 11/17857 701/10 |
| 7,970,532 B2 * | 6/2011 | Tehan | G01C 21/20 701/423 |
| 9,415,870 B1 * | 8/2016 | Beckman | B64C 39/024 |

(Continued)

*Primary Examiner* — Mussa A Shaawat
(74) *Attorney, Agent, or Firm* — McDonnell Boehnen Hulbert & Berghoff LLP

(57) ABSTRACT

Example methods, systems, and articles of manufacture may relate to an aerial vehicle. The methods, systems, and articles of manufacture may include receiving an audio signal with a microphone of the aerial vehicle. The methods, systems, and articles of manufacture may also include processing the audio signal to determine at least one of a distance and type of aircraft located near the aerial vehicle. Additionally, the methods, systems, and articles of manufacture may include, based on the determination, performing at least one maneuver of the aerial vehicle.

17 Claims, 11 Drawing Sheets

(56) References Cited

U.S. PATENT DOCUMENTS

| | | |
|---|---|---|
| 9,523,986 B1 | 12/2016 | Abebe et al. |
| 9,747,901 B1 | 8/2017 | Gentry |
| 9,889,931 B2 | 2/2018 | Xu et al. |
| 10,019,907 B2 | 7/2018 | Kanade et al. |
| 10,198,955 B1* | 2/2019 | Boyd .................. G08G 5/006 |
| 10,495,546 B2* | 12/2019 | Bense .................. G01M 15/12 |
| 2002/0004695 A1 | 1/2002 | Glenn et al. |
| 2009/0143988 A1* | 6/2009 | Tillotson .................. G01P 5/26 342/26 B |
| 2010/0100269 A1* | 4/2010 | Ekhaguere ........... G08G 5/0086 701/26 |
| 2010/0161255 A1* | 6/2010 | Mian .................. G01N 29/4463 702/56 |
| 2012/0027217 A1* | 2/2012 | Jun ........................... H04S 7/30 381/58 |
| 2015/0066240 A1 | 3/2015 | Das Adhikary |
| 2015/0302858 A1 | 10/2015 | Hearing et al. |
| 2016/0054233 A1* | 2/2016 | Bense .................. G01J 5/0022 73/627 |
| 2016/0063987 A1* | 3/2016 | Xu .................. G10K 11/17881 381/71.14 |
| 2016/0070265 A1 | 3/2016 | Liu et al. |
| 2016/0103038 A1* | 4/2016 | Lacaille ............. G05B 23/0229 73/114.07 |
| 2016/0183024 A1 | 6/2016 | Karkkainen et al. |
| 2016/0186890 A1* | 6/2016 | Bense .................. F16K 37/0083 137/557 |
| 2016/0236690 A1* | 8/2016 | Juneja .................... B60W 50/14 |
| 2016/0240017 A1* | 8/2016 | Lacaille ............. G05B 23/0254 |
| 2016/0247405 A1 | 8/2016 | Paczan et al. |
| 2017/0039857 A1 | 2/2017 | Kwan |
| 2017/0092138 A1 | 3/2017 | Trundle et al. |
| 2017/0148467 A1 | 5/2017 | Franklin et al. |
| 2017/0220036 A1 | 8/2017 | Visser et al. |
| 2017/0234724 A1 | 8/2017 | Naguib et al. |
| 2017/0234966 A1 | 8/2017 | Naguib et al. |
| 2017/0301248 A1 | 10/2017 | Silverman |
| 2017/0339487 A1 | 11/2017 | Alvord et al. |
| 2018/0046187 A1 | 2/2018 | Martirosyan et al. |
| 2018/0050800 A1 | 2/2018 | Boykin et al. |
| 2018/0061243 A1 | 3/2018 | Shloosh |
| 2018/0075834 A1 | 3/2018 | Fong |
| 2018/0090018 A1 | 3/2018 | Gavrilets et al. |
| 2018/0105270 A1 | 4/2018 | Xu et al. |
| 2018/0129881 A1 | 5/2018 | Seeber et al. |
| 2018/0129882 A1 | 5/2018 | Seeber et al. |
| 2018/0203470 A1 | 7/2018 | Pattison et al. |
| 2018/0329020 A1 | 11/2018 | Hafizovic et al. |
| 2019/0228667 A1* | 7/2019 | Matsumoto .......... G08G 5/0026 |
| 2019/0266410 A1 | 8/2019 | Seeber et al. |

\* cited by examiner

AUDIO BASED AIRCRAFT DETECTION

CROSS REFERENCE TO RELATED APPLICATIONS

This present application is a continuation of U.S. patent application Ser. No. 15/632,745, filed on Jun. 26, 2017, which is herein incorporated by reference in its entirety and for all purposes.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances, may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter unmanned aerial vehicles (UAVs), among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

During operation, it may be desirable for the aerial vehicle to detect the presence of other nearby aircraft, such as unmanned aerial vehicles, passenger aircraft, etc. While systems exist for aircraft to report their locations through radio transponders (also known as squawking), not all aircraft will report their locations. The present disclosure is generally related to detecting the presence of aircraft without using the radio squawk. This would allow the aerial vehicle to detect aircraft that are either not transmitting a squawk or as a backup in case squawking radio system are unavailable.

SUMMARY

Example methods may relate to an aerial vehicle. The method may include receiving an audio signal with a microphone of the aerial vehicle. The method may also include processing the audio signal to determine at least one of a distance and type of aircraft located near the aerial vehicle. Additionally, the method may include, based on the determination, performing at least one maneuver of the aerial vehicle.

In one example, an aerial vehicle is provided. The aerial vehicle includes a control system configured to control the aerial vehicle during operation. The aerial vehicle also includes at least one microphone configured to receive audio of an environment of the aerial vehicle. The aerial vehicle also includes a processing unit configured to determine at least one of a distance and type of aircraft located near the aerial vehicle. The processing unit is also configured to cause the control system to perform at least one maneuver of the aerial vehicle based on the determination.

In addition, the aerial vehicle may also include an article of manufacture having a non-transitory computer-readable medium having stored thereon instructions that, when executed by a processor in an aerial vehicle, cause the aerial vehicle to perform operations. The operations include receiving an audio signal with a microphone of the aerial vehicle. The operations also include processing the audio signal to determine at least one of a distance and type of aircraft located near the aerial vehicle. The operations further include based on the determination, performing at least one maneuver of the aerial vehicle.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
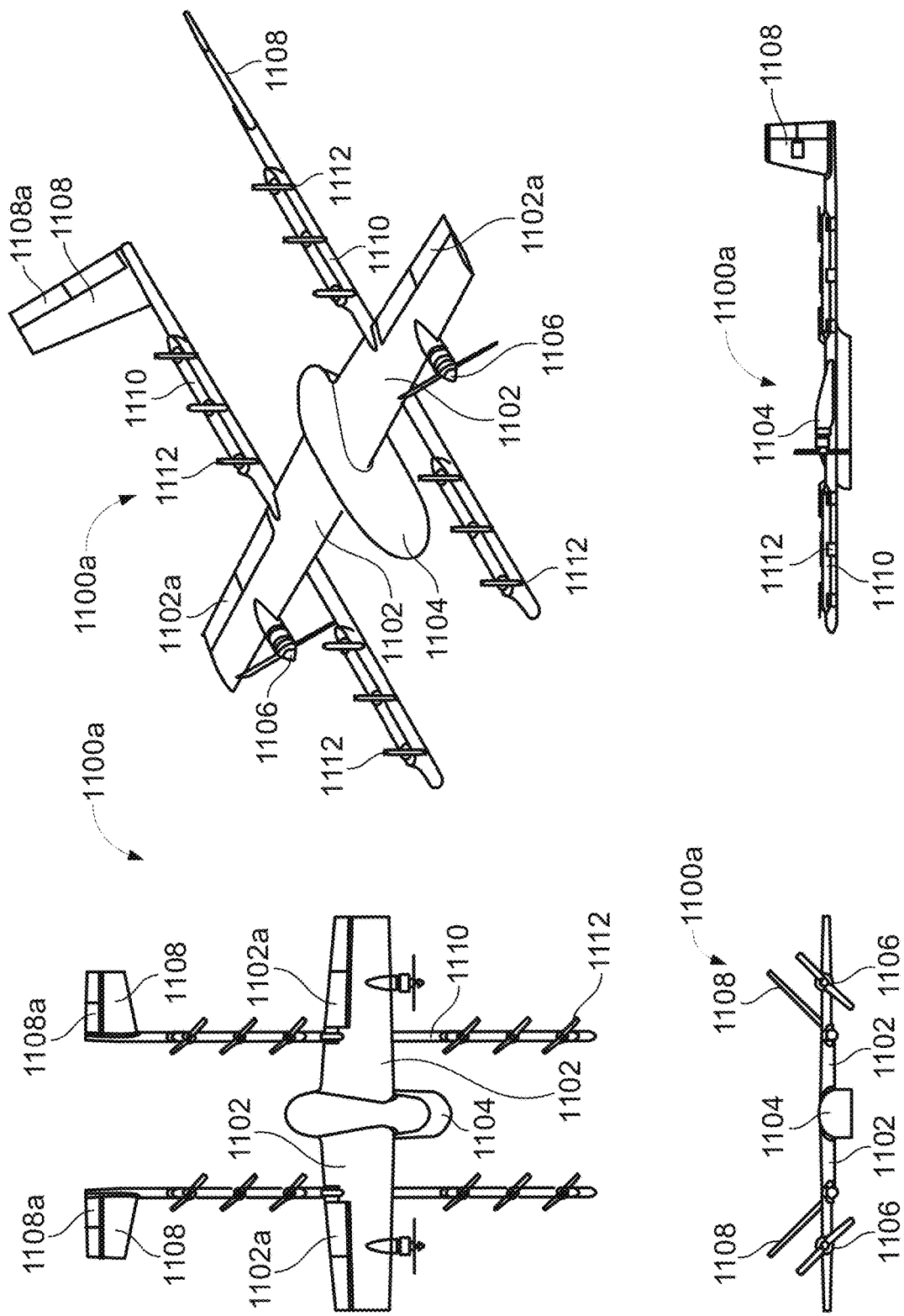
FIG. 1A is a simplified illustration of an unmanned aerial vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures. Additionally, although this disclosure may generally refer to UAVs, some of the system and methods may also be operable with manned and/or manually controlled aircraft as well.

I. Overview

Example embodiments facilitate an aerial vehicle detecting the presence of other aerial vehicles based on the sounds produced by the other aerial vehicle. By using a microphone on the aerial vehicle, sound maybe received of the environment in which the aerial vehicle is operating. The sounds will include sounds produced by the aerial vehicle itself as well as sounds of the other aircraft operating near the aerial vehicle. Upon receiving sound, the aerial vehicle may process the received sound to distinguish sound produced by other aircraft from sound produced by its own flight, and thereby determine if another aircraft is present nearby. Once another aircraft is detected by sound, the aerial vehicle may perform a maneuver in response. The maneuver may include changing altitude, direction of flight, and/or landing the aerial vehicle.

More specifically, example embodiments relate to method systems and devices that allow an aerial vehicle to record sound and analyze the recorded sound. In some examples, the aerial vehicle may use a classification to determine a type of aircraft that is causing the sound. The classification maybe trained based on prerecorded sounds of known aircraft types. In some examples, the classification may be trained based on publicly available videos (including audio samples), such as those on YouTube. Based on the classification, the aerial vehicle may be able to determine what type of aircraft is producing the received audio. The maneuver taken in response may depend on the type of aircraft. Additionally, in some examples the aerial vehicle may also determine an approximate distance to the aircraft that produced the received audio. The aerial vehicle may determine distance based on an amplitude of the received audio signal. Generally, the closer an aircraft is to the aerial vehicle, the greater the amplitude of the audio signal.

In some additional examples, the microphones of the aerial vehicle may receive audio of its own motors during flight. The aerial vehicle may be able to create a profile of its own sound fingerprint based on recorded audio of its own flight. When receiving an audio signal during operation, the aerial vehicle maybe able to remove sounds that it determines are created by itself. Therefore, after removing sounds it knows it created itself, the audio may contain only sound that was not produced by the motors of the aircraft. Thus, the aerial vehicle may be more easily to identify sounds produced by other aircraft.

In some further examples, the aerial vehicle may perform a classification on the received audio to determine if the motors of the aerial vehicle are operating correctly. For example, the aerial vehicle may know what the correct operation of the motors sounds like. The aerial vehicle may be able to determine when motor is failing based on the change in the received audio.

The aerial vehicle may include a plurality of microphones configured to receive audio. In some examples the microphones maybe directional, that is they are more sensitive to receiving audio signals in one direction. The aerial vehicle may be able to determine an approximate angle to the aircraft that produced the audio based on the signals received from the plurality of microphones. In some further examples, the microphones maybe arranged in an array. The array of microphones may be able to use beam steering (or other method) to figure out an angle of the received audio. Using beam steering to find the source of an audio signal maybe known as direction of arrival analysis.

In some additional examples, the aerial vehicle may use sensor fusion to determine the presence of other aircraft. In a sensor fusion set up, the aerial vehicle may use optical imaging, radar, or other sensors to help determine the presence of an aircraft. In some examples, in order to save power, additional sensors may not be used until the audio system indicates the presence of an aircraft.

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is a simplified illustration providing various views of a UAV, according to an example embodiment. In particular, FIG. 1A shows an example of a fixed-wing UAV 1100a, which may also be referred to as an airplane, an aeroplane, a biplane, a glider, or a plane, among other possibilities. The fixed-wing UAV 1100a, as the name implies, has stationary wings 1102 that generate lift based on the wing shape and the vehicle's forward airspeed. For instance, the two wings 1102 may have an airfoil-shaped cross section to produce an aerodynamic force on the UAV 1100a.

As depicted, the fixed-wing UAV 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAV 1100a may also include landing gear (not shown) to assist with controlled take-offs and landings. In other embodiments, other types of UAVs without landing gear are also possible.

The UAV 1100a further includes propulsion units 1106 positioned on the wings 1106 (or fuselage), which can each include a motor, shaft, and propeller, for propelling the UAV 1100a. Stabilizers 1108 (or fins) may also be attached to the UAV 1110a to stabilize the UAV's yaw (turn left or right) during flight. In some embodiments, the UAV 1100a may be also be configured to function as a glider. To do so, UAV 1100a may power off its motor, propulsion units, etc., and glide for a period of time. In the UAV 1100a, a pair of rotor supports 1110 extend beneath the wings 1106, and a plurality of rotors 1112 are attached rotor supports 1110. Rotors 1110 may be used during a hover mode wherein the UAV 1110a is descending to a delivery location, or ascending following a delivery. In the example UAV 1100*a*, stabilizers 1108 are shown attached to the rotor supports 1110.

During flight, the UAV 1100*a* may control the direction and/or speed of its movement by controlling its pitch, roll, yaw, and/or altitude. For example, the stabilizers 1108 may include one or more rudders 1108*a* for controlling the UAV's yaw, and the wings 1102 may include one or more elevators for controlling the UAV's pitch and/or one or more ailerons 1102*a* for controlling the UAV's roll. As another example, increasing or decreasing the speed of all the propellers simultaneously can result in the UAV 1100*a* increasing or decreasing its altitude, respectively.

Figure 1B:
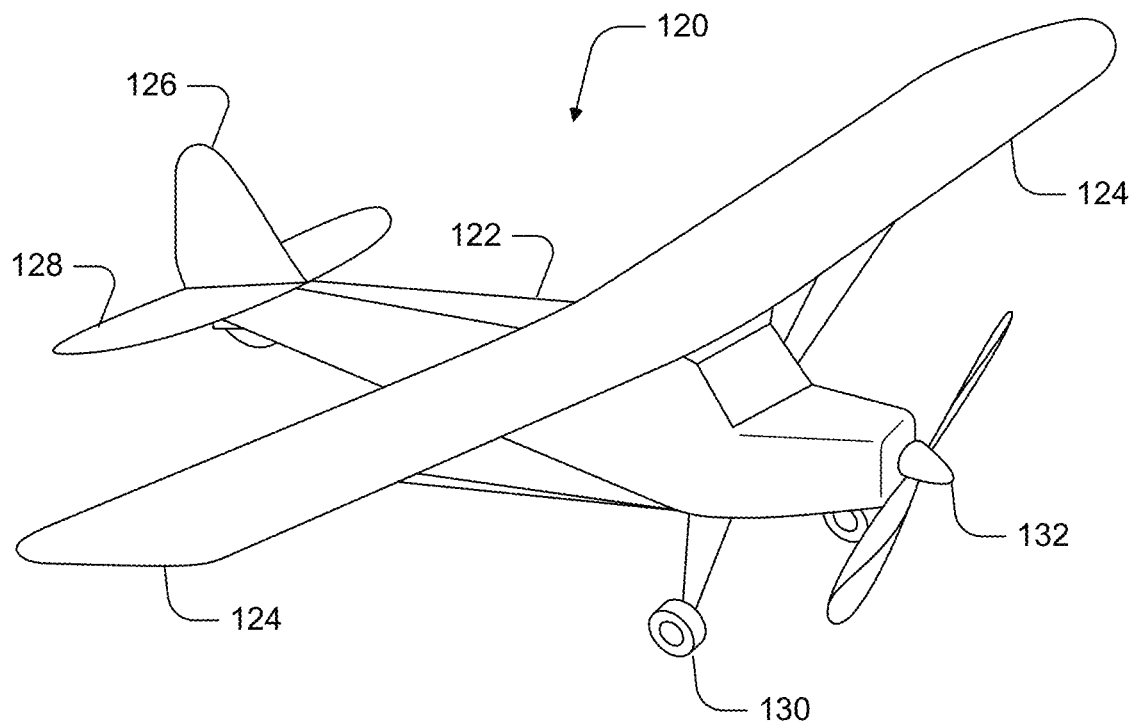
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
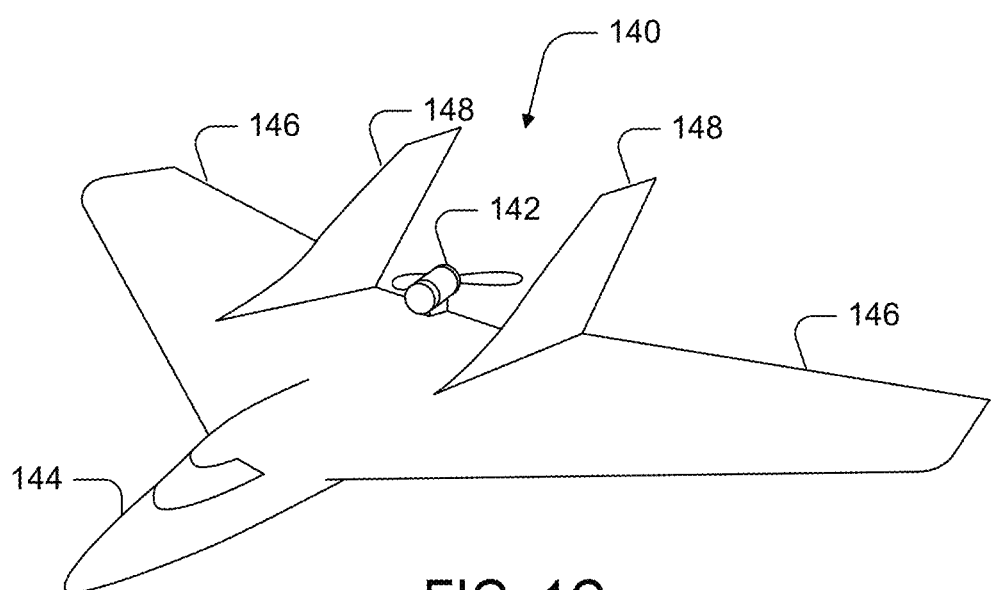
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1, FIG. 1C depicts common structures used in a pusher plane, including a fuselage 144, two wings 146, vertical stabilizers 148, and the propulsion unit 142, which can include a motor, shaft, and propeller.

Figure 1D:
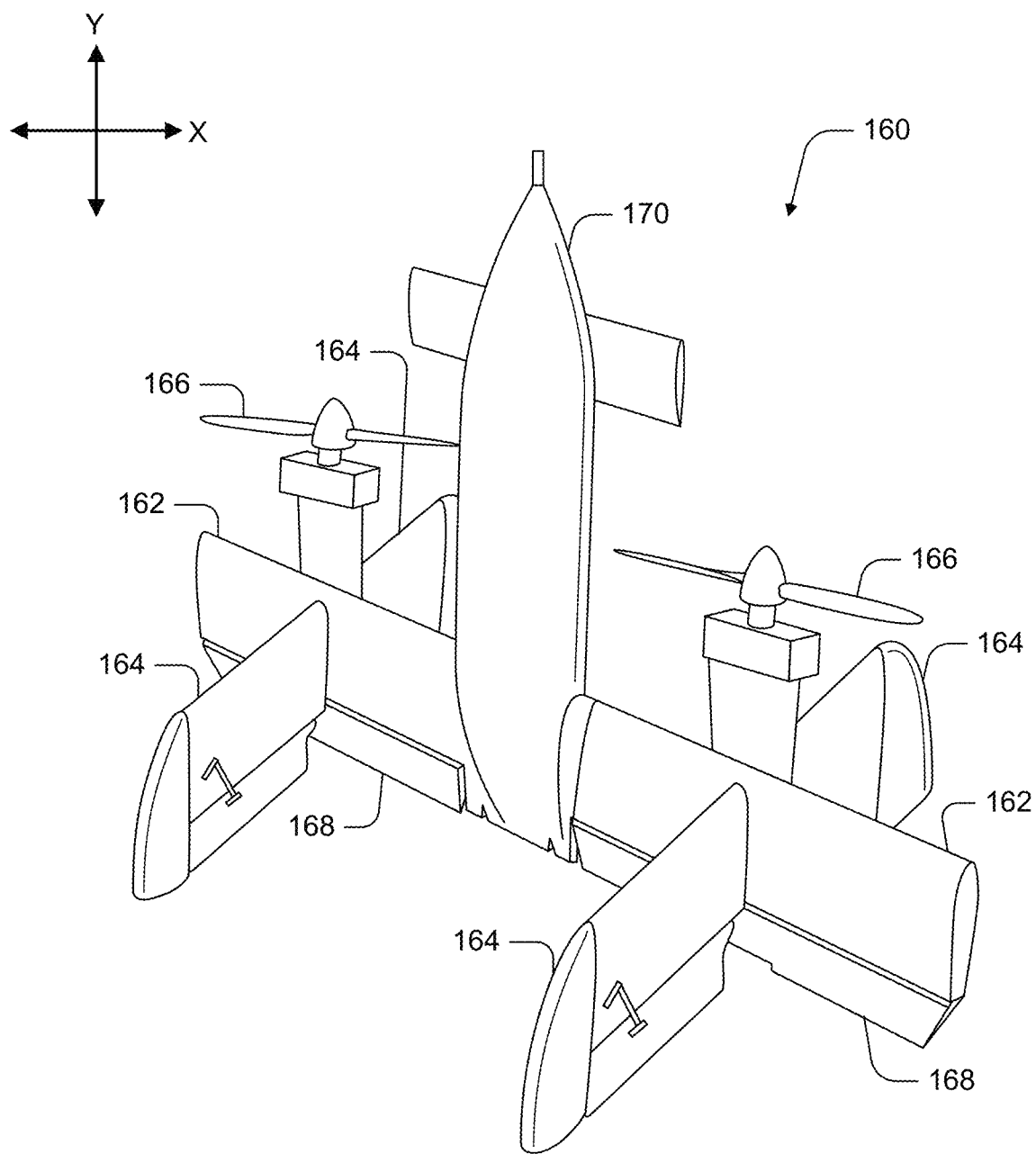
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
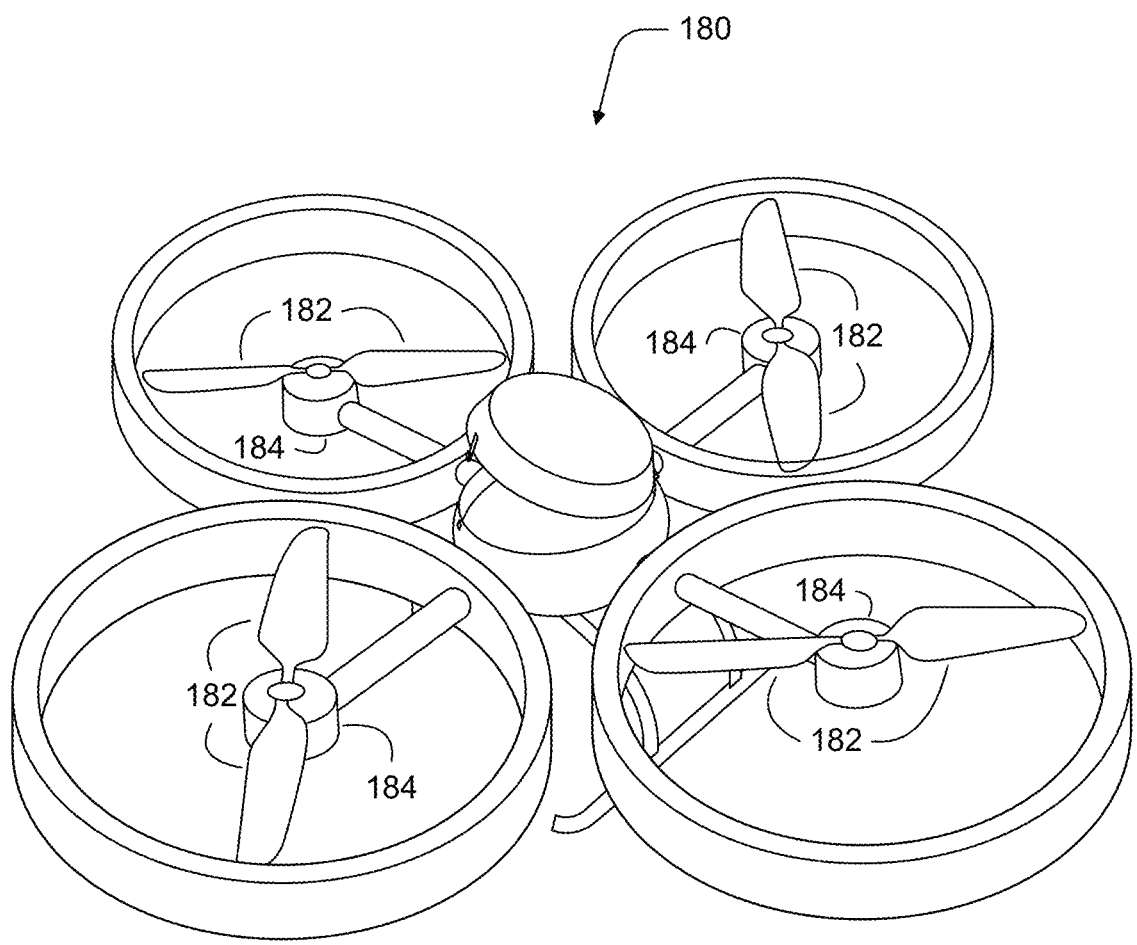
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
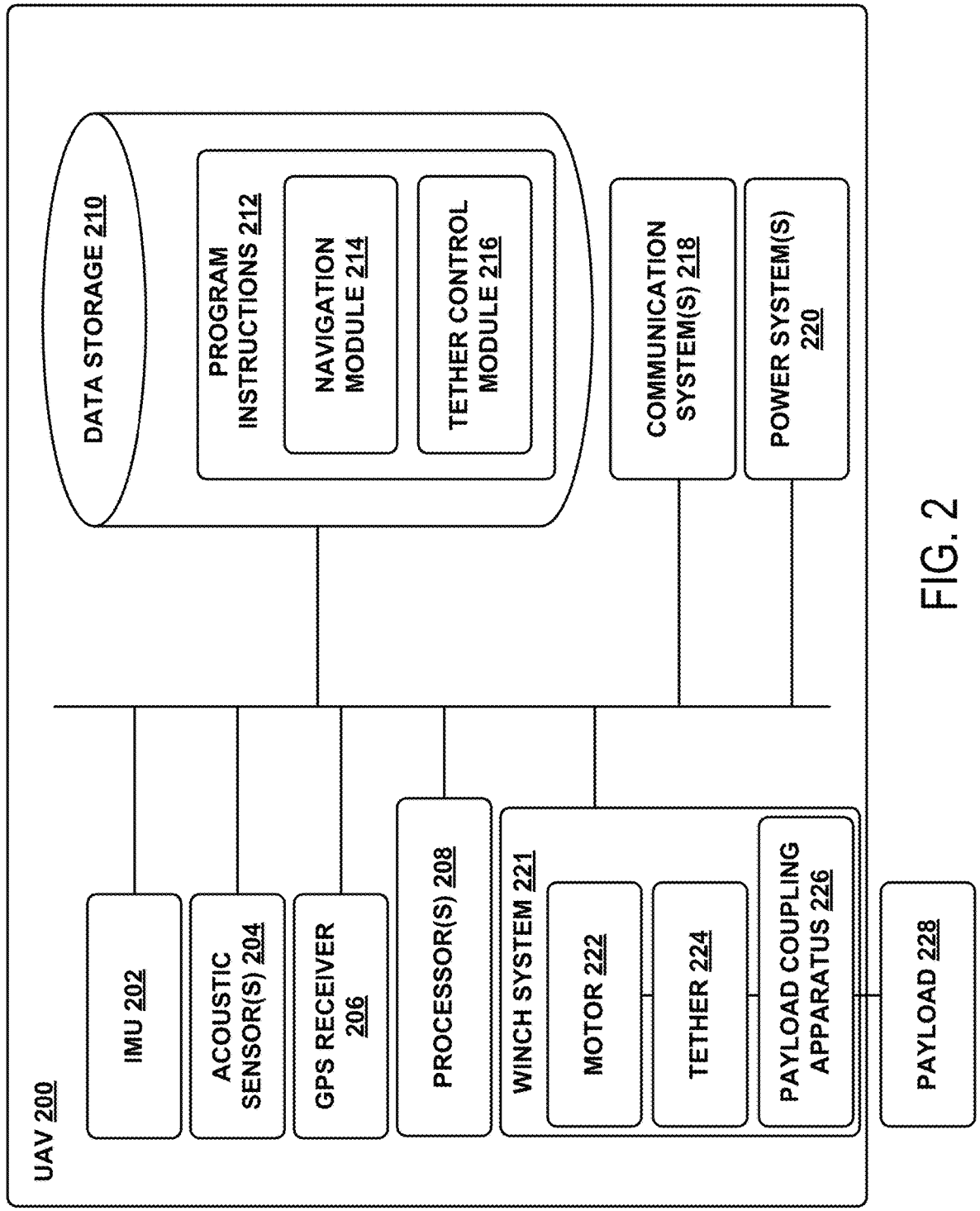
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, acoustic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices. The data storage may include a memory, such as a Random Access Memory (RAM).

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes acoustic sensor(s) 204. Acoustic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. In some other examples, the acoustic sensor(s) 204 may be one or more microphones. The microphones may be configured to receive audio of the environment in which the UAV 200 operates. This received audio may include sounds produced by the UAV 200 as well as sounds of other aircraft operating near the UAV 200.

Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e,g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, acoustic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload coupling apparatus 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload coupling apparatus 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may, based on the current supplied to the motor 222, determine if the payload 228 is attached to the tether 224, if someone or something is pulling on the tether 224, and/or if the payload coupling apparatus 226 is pressing against the UAV 200 after retracting the tether 224. Other examples are possible as well.

During delivery of the payload 228, the payload coupling apparatus 226 can be configured to secure the payload 228 while being lowered from the UAV by the tether 224, and can be further configured to release the payload 228 upon reaching ground level. The payload coupling apparatus 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative System Design

Figure 3A:
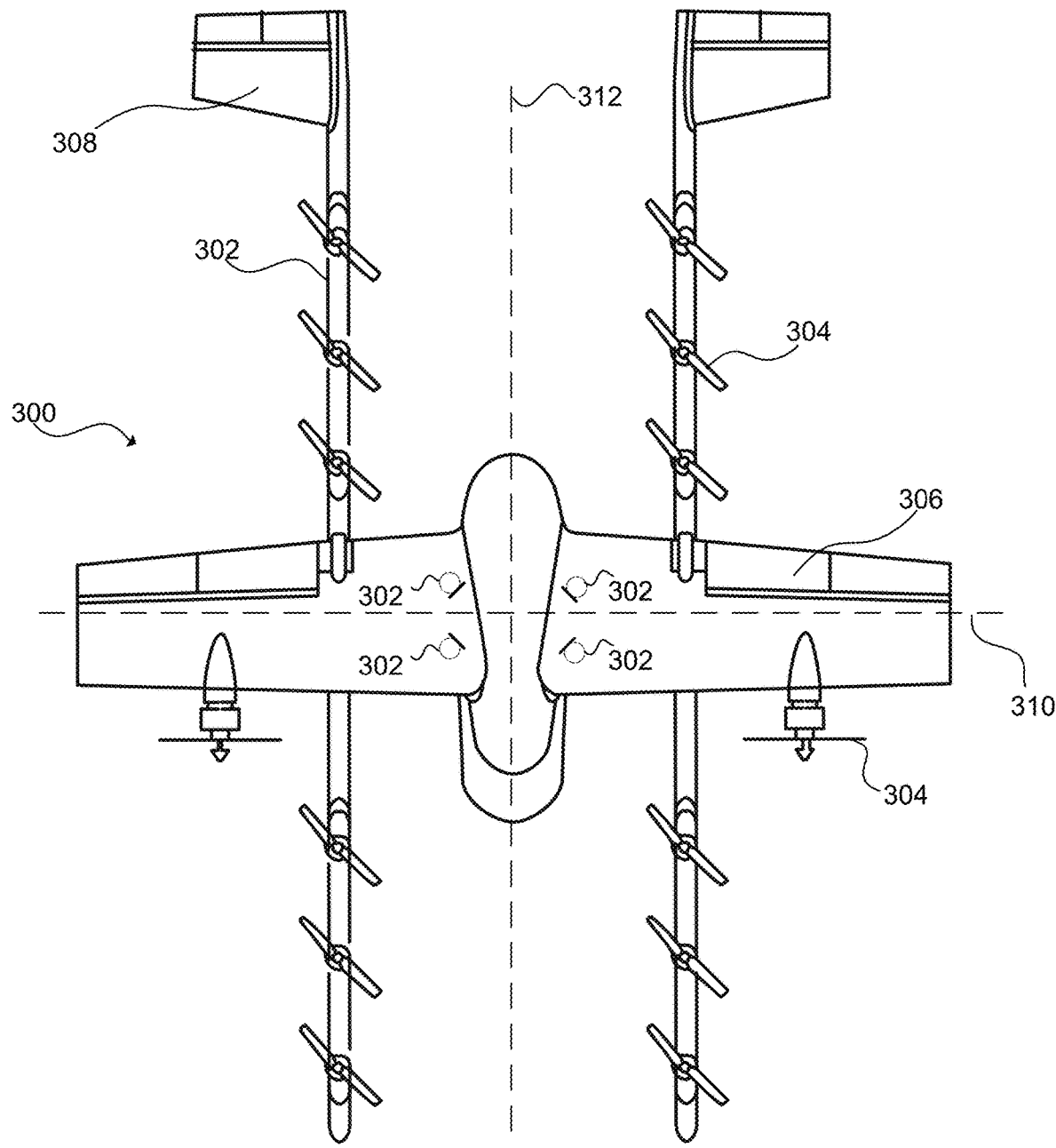
FIG. 3A is a top down view of an unmanned aerial vehicle having an example microphone arrangement, according to an example embodiment.

FIG. 3A is a top down view of an unmanned aerial vehicle having an example microphone arrangement, according to an example embodiment. In the present example, the UAV 300 includes a wing and four microphones 302. Although UAV 300 is shown having four microphones 302, the number and placement of microphones may be varied in different embodiments. Each of the microphones 302 may be a directional microphone configured to optimally receive sounds in a given direction. Each of FIGS. 3A-3D show a microphone arrangement. The various arrangements of microphones may be combined and/or modified within the context of the present disclosure.

As shown in FIG. 3A, the UAV 300 may have axes 310 and 312 that are aligned along the major axes of the UAV 300. The microphones 302 may be aligned with each being positioned 45 degrees from the axes of the UAV 300. The axes 310 and 312 may define four different symmetric regions, each region having a respective directional microphone.

Also shown in FIG. 3A are propellers 304 attached to motors (not shown) and control surfaces 306 and 308. The microphones 302 may be able to receive sounds created by the propellers 304, motors, and control surfaces 306 and 308 during the operation of the UAV 300.

Figure 3B:
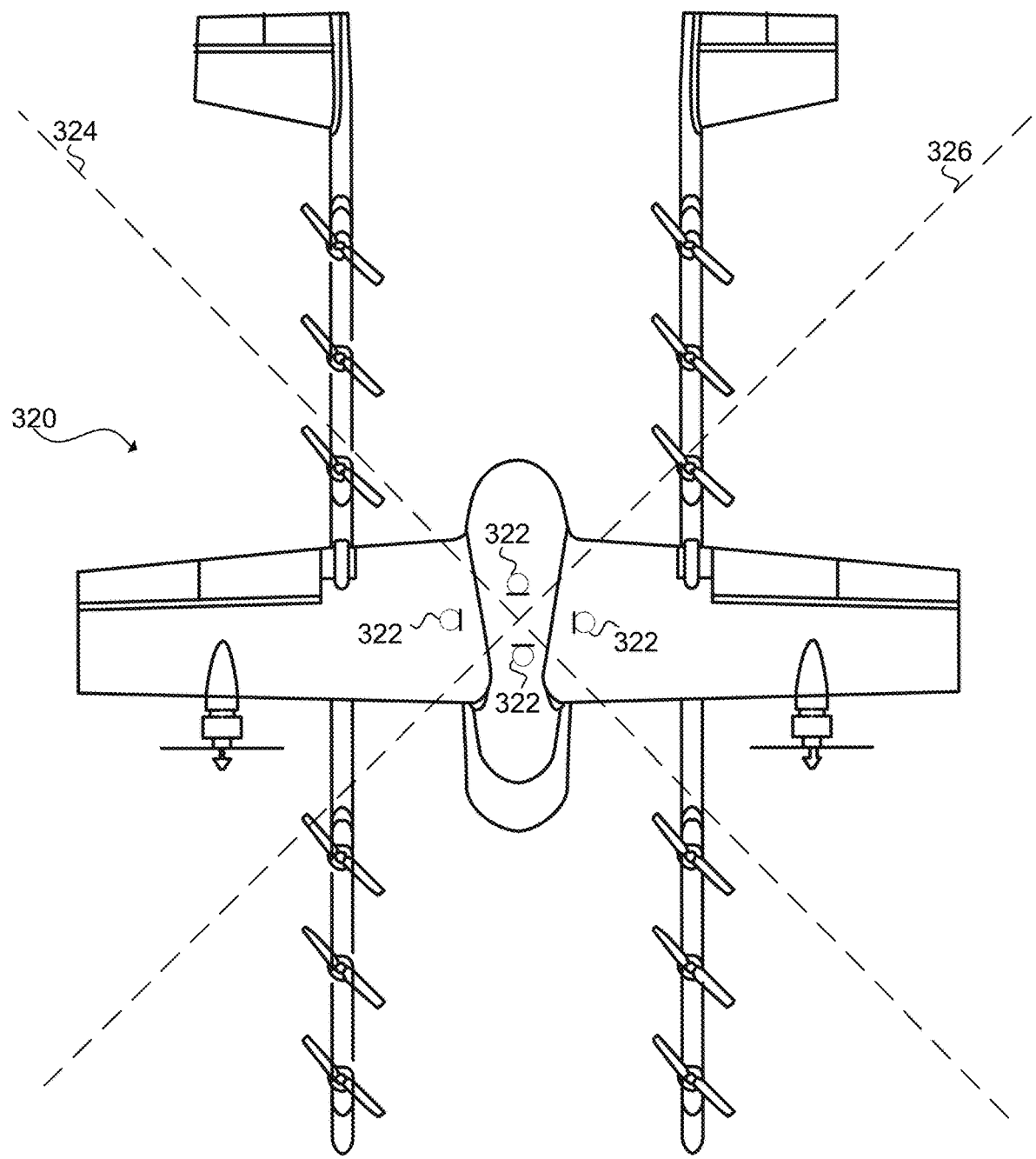
FIG. 3B is a top down view of an unmanned aerial vehicle having an example microphone arrangement, according to an example embodiment.

FIG. 3B is a top down view of an unmanned aerial vehicle 320 having an example microphone arrangement, according to an example embodiment. The UAV 320 of FIG. 3B may be similar to UAV 300 of FIG. 3A, but have a different microphone arrangement. As shown in FIG. 3B, the UAV 300 may have axes 324 and 326 that are aligned 45 degrees from the major axes of the UAV 300. The microphones 322 may be aligned with each being positioned along the major axes of the UAV 300. Similar to FIG. 3A, the axes 310 and 312 may define four different symmetric regions, each region having a respective directional microphone. Each of the microphones 322 may be configured to primarily receive sounds from the respective region in which the microphone is directed. In further examples, the regions may not be symmetric and may have different sizes and positions. For example, a forward-positioned region may be more narrow and a rearward-positioned region may be wider than those shown in FIG. 3B.

Figure 3C:
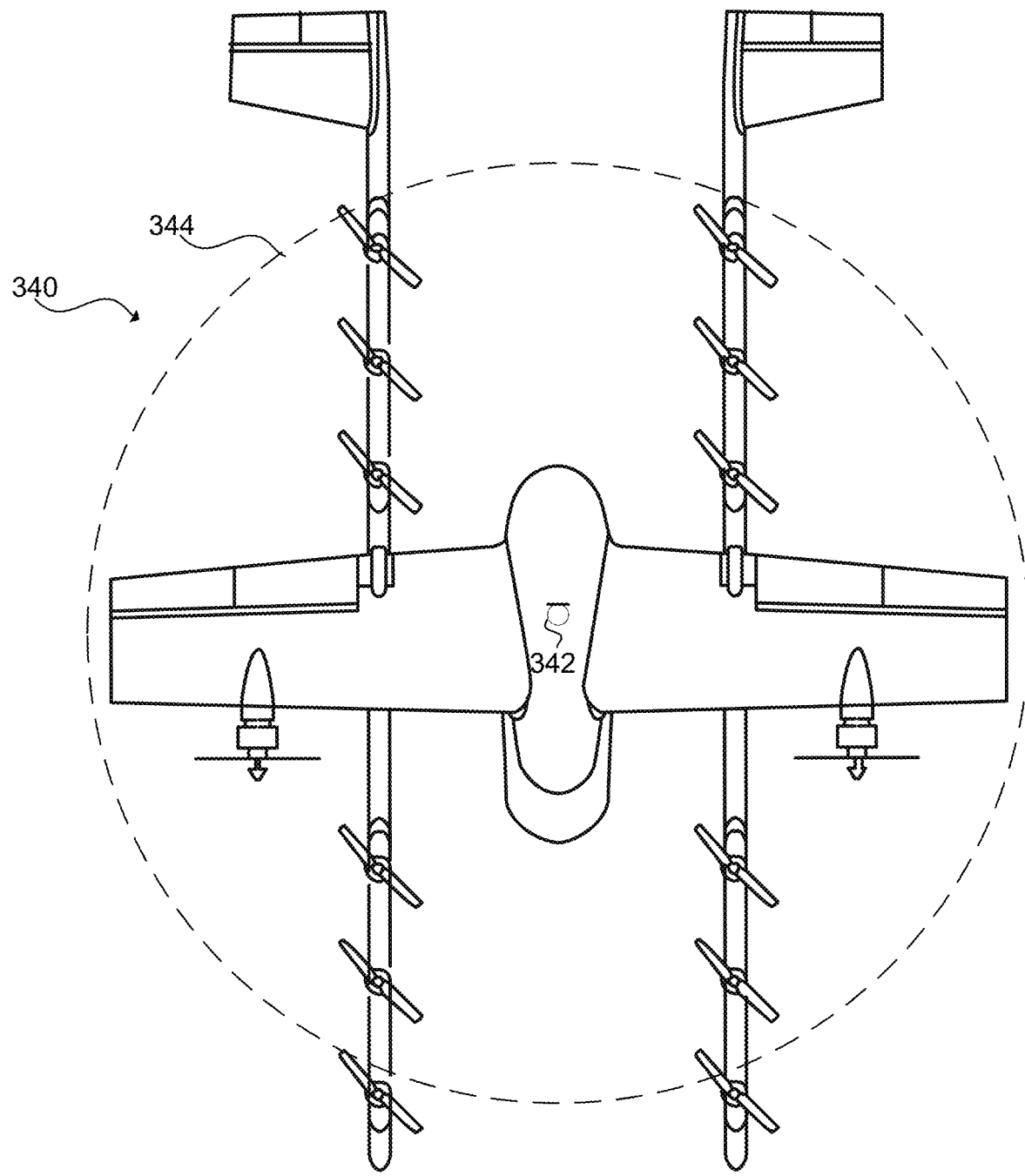
FIG. 3C is a top down view of an unmanned aerial vehicle having an example microphone arrangement, according to an example embodiment.

FIG. 3C is a top down view of an unmanned aerial vehicle 340 having an example microphone arrangement, according to an example embodiment. As shown in FIG. 3C, UAV 340 may include a unidirectional microphone 342. The unidirectional microphone may receive signals from the full range around the UAV 340, as shown by line 344. In some examples, the unidirectional microphone 342 may be combined with some of the other various microphone layouts. In various examples, different arraignments of microphones having different reception patterns may be used. In one example, the UAV 340 may receive a sound with both a unidirectional microphone 342 and another directional microphone at the same time. The use of a combination of microphones with different properties may aid in the detection of other aircraft.

Figure 3D:
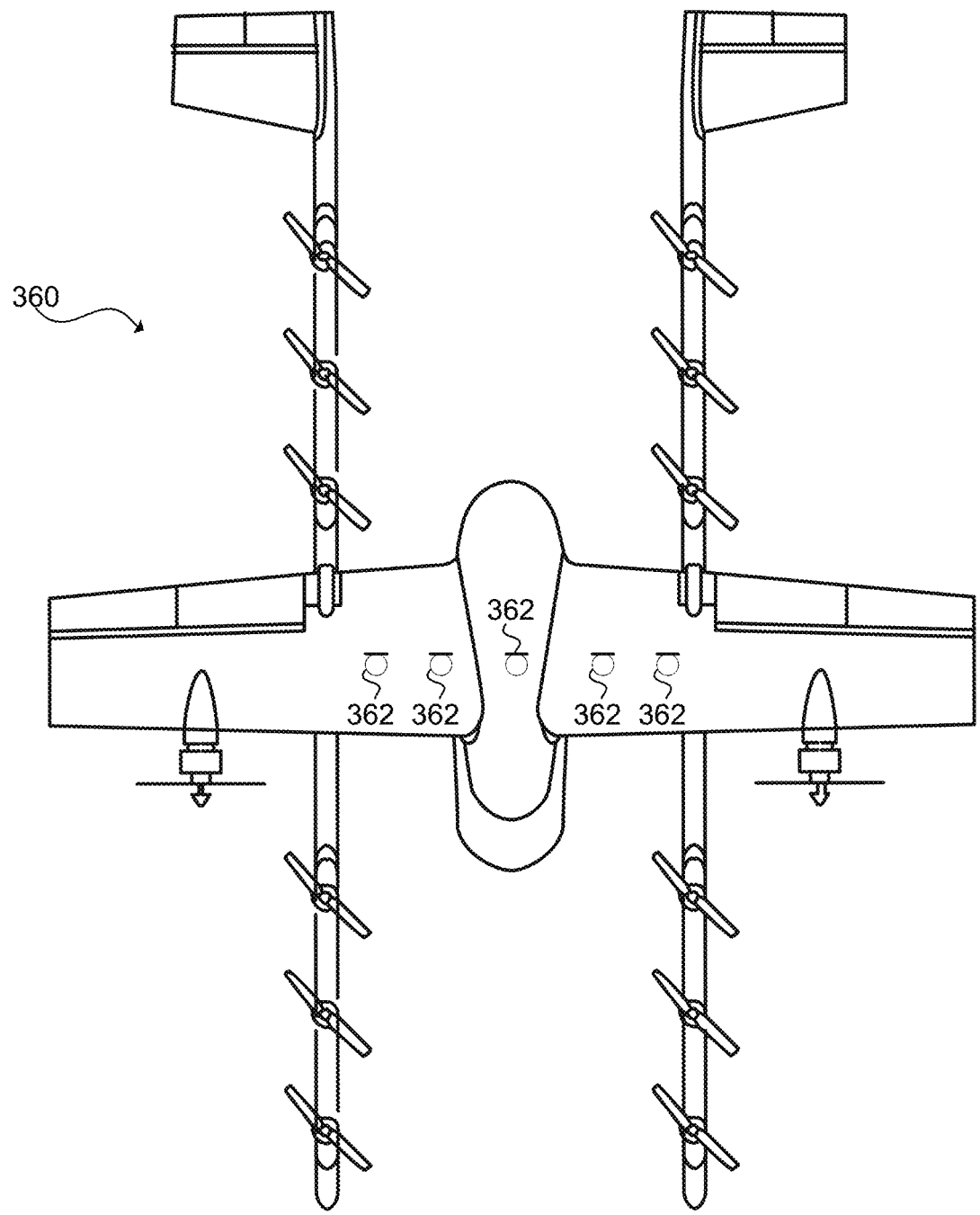
FIG. 3D is a top down view of an unmanned aerial vehicle having an example microphone arrangement, according to an example embodiment.

FIG. 3D is a top down view of an unmanned aerial vehicle 340 having an example microphone arrangement, according to an example embodiment. As shown in FIG. 3D, UAV 340 may include an array of microphones 362. The array of microphones 362 may be configured with directional or unidirectional microphones, such as those previously discussed. In some examples, an array of microphones 362 may be used to capture audio signals so that a processor can use to perform a direction of arrival analysis. Although the array of microphones 362 is shown as a linear array, other shapes and arrangement of arrays are possible as well.

Figure 4:
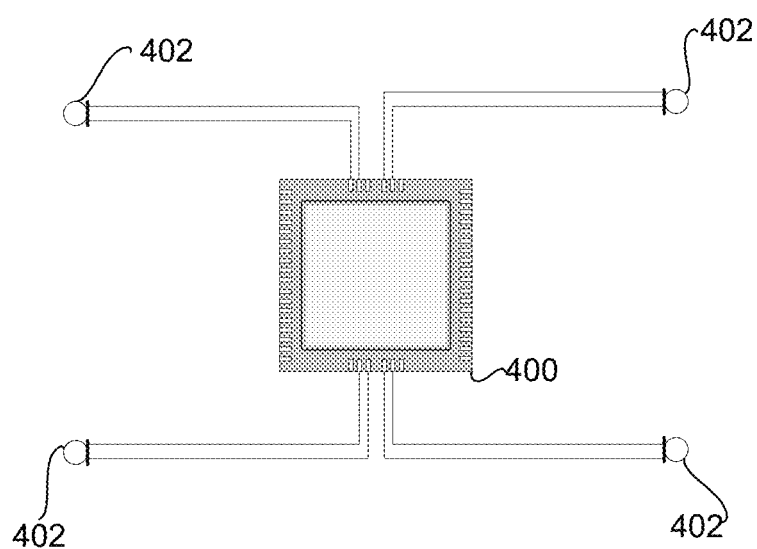
FIG. 4 is a simplified diagram of a processor module of an unmanned aerial vehicle, according to an example embodiment.

FIG. 4 is a simplified diagram of a processor module of an unmanned aerial vehicle, according to an example embodiment. In some examples the processor module may only include one central processor of a UAV. In other examples, the processor module may include individual processors, each having an associated processing function. In the present example, the UAV includes a processor 400, in some examples, the processor 400 may be a central processor designed to control many of the functions of the UAV. In some other examples, the processor 400 may be a processor specific to audio processing. Other configurations of processors are possible as well. In some examples, the processor may be configured to perform operations corresponding to all or part of method 500 of FIG. 5.

In the present example, the processor may be configured to receive an input from the various microphones 402 of the UAV. The processor 400 may be coupled to the microphones, as shown in FIG. 4. In other examples, the processor 400 may be coupled to a memory that stores data received by the microphones 402. The memory may be a volatile memory, such as RAM, or a non-volatile memory, such as flash memory.

In some examples, the audio signals received by the microphones 402 may be stored in a memory by the processor 400. In other examples, the processor 400 may process and adjust the received audio before it is stored in the memory.

The audio may be adjusted in a variety of ways. In some examples, the UAV my process or filter the received audio to remove sound related to wind from the received audio. In some other examples, a processor of the UAV may be able to remove audio signals from received audio that are caused by the UAV itself. In this example, the saved audio may be audio from the environment of the UAV other than the sounds produced by the UAV.

Figure 5:
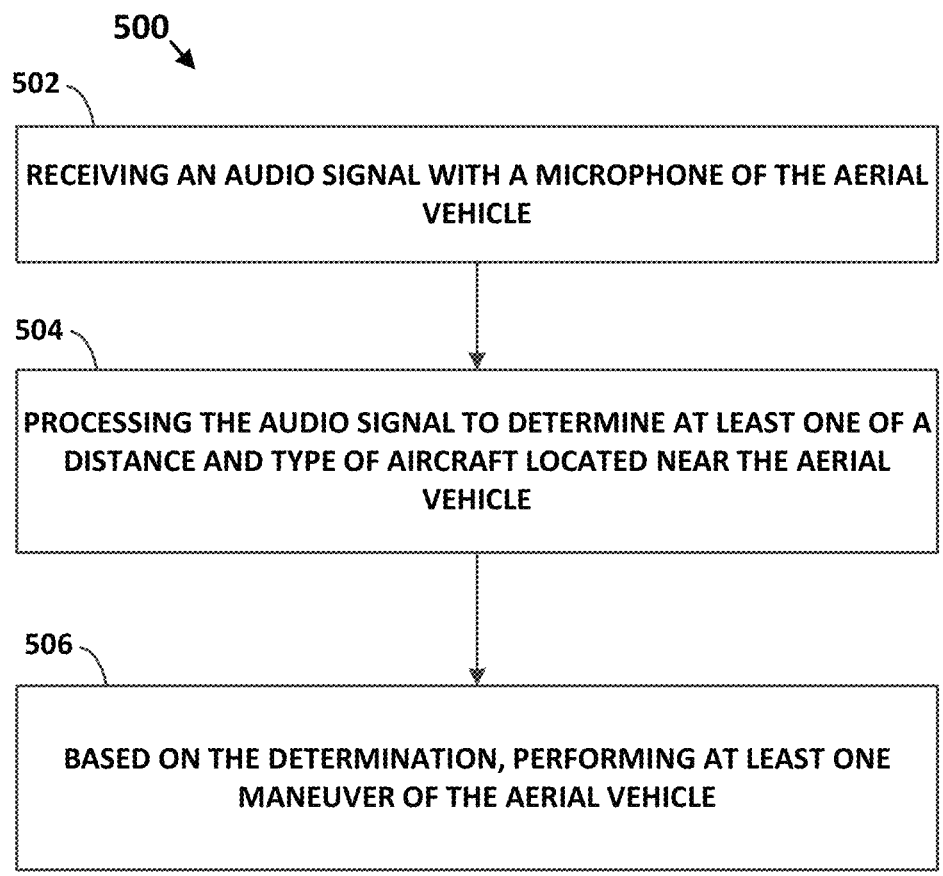
FIG. 5 is a flowchart of a method for use within the present disclosure.

FIG. 5 is a flowchart of a method for use within the present disclosure. At block 502, the method includes "receiving an audio signal with a microphone of the aerial vehicle." In various embodiments, the UAV may receive an audio signal from the environment in which the vehicle operates in a variety of ways. A sensor system on the UAV may include at least one microphone configured to provide an audio signal captured from the environment. Each microphone may communicate data to a processor in the vehicle about information each microphone receives.

In an example, each microphone may be configured to capture audio of environment surrounding the UAV. Sounds captured by the microphone may include the sounds of other aircraft located near the UAV. For example, the microphone may capture the sound of another aircraft flying near the UAV. A processing system (described with respect to block 504 below) may be configured to identify that the captured audio signal is indicative of a certain model of aircraft. In another example, the microphone may capture the sound of the UAV's motors. The processing system may be able to identify if the motors are functioning correctly based on the captured sound.

In one embodiment, the audio system of vehicle may record the audio captured by the microphone. The audio captured by the microphone may be stored in a memory similar to a cache (e.g., a RAM of the UAV). The captured audio may be stored only temporarily for processing with the methods and systems described herein. After the audio has been processed, it may be removed from the memory of the vehicle. Therefore, in some embodiments, the vehicle may not store audio information, other than the temporary storage for processing disclosed herein.

At block 504, the method includes "processing the audio signal to determine at least one of a distance and type of aircraft located near the aerial vehicle." In some examples, block 504 includes processing the audio signal from the audio unit to create a plurality of audio samples. The plurality of audio samples includes audio samples of varying lengths. As the audio unit receives audio, the received audio may be stored as audio samples of different lengths based on the length of time for the audio windows. Additionally, each respective audio length of time for the audio windows may have multiple samples stored as time progresses. Yet further, the audio system may perform these operations on the audio signal from each microphone.

For example, in one embodiment, there may be two audio windows, one of 1 second (s) and another of 5 s. As audio is received by the audio unit, two samples may be stored, one of 1 s and another of 5 s. After an amount of time equal to the respective sample length, the audio unit may stop storing data for the respective window and start storing a new sample. Therefore, the audio unit may create several audio samples at the same time, and as time progresses, by starting and stopping recording the various audio samples based on the length of time of the respective audio window. In another embodiment, the audio system may not record continuously. For example, the audio system may record audio for 1 second out of every 5 seconds and perform the processing described herein on the 1 second of audio.

In yet a further embodiment, the audio system may simultaneously record several audio signals, for each microphone, based on the various audio windows for processing by a classifier. In one example, four different windows may be used to create audio sample of 0.5 second (s), 1 s, 2.5 s, and 5 s. The audio system may store an audio signal captured by the microphone for each of the respective window lengths. Thus, the audio system may only store audio signals in lengths equivalent to those of the various windows.

There is often a trade-off that can be made between the precision of the system (how accurately audio features are recognized) and the speed of the system (how quickly a feature can be recognized). The present disclosure may include a system first analyzes short audio samples to try and identify features and falls back to longer audio samples for more accuracy. Thus, the system will generally operate to quickly identify audio features. For example, in some embodiments, even when the UAV has a low confidence of a detected object, it may alter a movement of the UAV in order to make sure the vehicle is operated safely. Therefore, the system may capture several audio samples of varying lengths to ensure the reliability of a detection event.

Block 504 may further include the vehicle determining a likelihood that the first audio sample includes an audio feature, such as the sound of another aircraft. The likelihood may be determined in a variety of different ways depending on the specific embodiment. In one embodiment, the processing system of the vehicle may include a classifier configured to measure various features of an audio sample. Based on the measured various features of the audio sample, the classifier may calculate a score for the respective audio signal, based on a classification profile. The higher the score, the more likely that the respective audio sample includes the desired audio feature. Additionally, various classification profiles may be used to detect various features, such as an aircraft-type classification profile. Therefore, the classification may be able to identify a type of aircraft the produced a sound in a received audio signal.

A classifier of the processing system may be configured to detect features of the different audio samples to detect a desired feature, such as a type of aircraft, despite noise in the audio signal. One method of detecting aircraft is based on training features for a classifier using collected training data. The collected training data may be audio (and video) samples from known aircraft types. For example, a classifier may be trained based on videos and/or audio samples available on the internet. In some examples, a classifier may be trained based on the audio from clips uploaded to websites such as YouTube™. Additionally, the classifier may be trained, or other signal processing means may be used, to remove noise from a received audio signal. The removed noise may include noises produced by the UAV, wind noise, and other sources of noise.

The second method is based on using audio fingerprints of known aircraft. Audio fingerprints may provide accurate recognizing of audio features, when encountering captured audio signals that are very similar aircraft sounds to the known set. In some embodiments, the processing system may use both the classifier-based detection method and the fingerprint-based method to detect desired audio features of a captured sample. A fingerprint may be a digital representation of an audio signal that is mathematically determined. A fingerprint may be used to determine if two audio samples are statistically similar.

As part of the classifier-based method, the classifier may analyze various sounds captured by the audio system of the vehicle. In some embodiments, it may be desirable for the system to identify features of the captured audio with a low latency (e.g., identify features quickly). The captured audio may have been windowed over different amounts of time to create overlapping audio samples of varied amounts of time. In one example, different windows may be used to create audio samples of varying lengths, such as of 0.5 second (s), 1 s, and 2.5 s. At block 308, the classifier may operate on the audio samples with a shorter length of time. By first operating on the short audio samples, desired features may be identified more quickly than if longer audio samples were analyzed first.

The classifier may operate by calculating a score for each of the audio samples. The classifier may calculate a score for each audio sample created with the short window time as the audio system stores the sample. Additionally, the system may delete the audio sample (e.g., no longer store the audio sample) after the classifier creates a score for the respective sample. The higher the score, the more likely the respective audio sample includes the desirable audio feature. For example, a high score for a respective aircraft may indicate the audio signal contains audio of that respective aircraft.

The sliding windows may enable the detection of a desired audio signal, such as a aircraft audio, within one second for many examples, but in noisy environments with lower signal/noise ratio the method can fall back on the longer length detection windows. Additionally, the classifier may be used to quickly identify possible audio feature in the received audio signal. The presently disclosed classifier may enable detection more quickly by having the classifier first operate on the short audio samples.

In some examples, the classifier may estimate the frequency spectral energy concentration estimation of the captured audio. The spectral energy concentration is a measurement of the power delivered by the audio signal with respect to the various frequency components of the audio signal. Both a monotonicity of the captured audio signal and the spectral energy concentration of the captured audio signal may be used by the classifier to determine if the captured audio signal has the desired features.

One example aircraft sound detection method may include a linear classifier. A linear classifier may be able to make a determination about whether the desired audio feature is present in an audio signal based on a linear combination of audio features. Other types of classifiers may be used as well. Some non-linear classifiers include quadratic classifiers, neural networks, and many other types. The disclosed methods and apparatuses may operate with the various types of classifiers.

In various embodiments, the data that the classifier uses to detect features of the windowed audio signals, the classification profile, may have one of several different sources. First, the classifier data may be preprogrammed to the UAV. For example, a set of data may be programmed to the memory of the UAV during production. Additionally, the set of data may be periodically updated to provide better classification. Second, the classifier may be adapted based on audio signals received by a respective UAV. For example, if a classifier erroneously indicates the presence (or absence) of an aircraft, a human may provide an input indicating the error. The classifier may be able to adapt the detection based on the input. In the third embodiment, the classifier may receive data from a network, such as the internet. A computer server may be able to communicate updated data to the UAV. The classifier, to increase the reliability of the classifier detecting audio features, may use the data communicated to the UAV from the computer server. For example, in some instances a UAV may send audio clips to an internet server for analysis. The internet server may analyze the audio clip and possibly determine a new set of classifier parameters. These new parameters may be communicated to one or more UAVs to update the classifier currently operating on the vehicle.

Along with the classification of aircraft types, the processing of the audio signals may be used to determine a range and/or an angle to an aircraft the produced the audio signal. In some examples, the UAV may calculate a range from the UAV to an aircraft that produced sounds received by the UAV based on an amplitude of the received audio signals. In some example, the audio system may use an absolute amplitude of a received audio signal or a ratio of an amplitude of received audio signals from multiple microphones. In some examples, the processing system may determine a ratio of an amplitude of a received audio signal from a unidirectional microphone to the amplitude of a received audio signal from a directional microphone. In other examples, discussed below, the amplitude of a received audio signal may be used in a sensor fusion algorithm to determine a range to the aircraft that produced the audio signal.

Further, at block 504, the processor may use a classification to determine a direction to the aircraft that produced the audio captured by the UAV. In some examples. The UAV may have a plurality of microphones. Each microphone may be a directional microphone. Based on the signals received by the various microphones, the processor of the UAV may be able to detect a direction from the UAV to the aircraft that created the audio. In some other examples, the UAV may have a microphone array. When audio is captured by microphones of the array, the processor may be able to perform a direction-of-arrival analysis in order to determine a direction to the source of the sound. In some yet further examples, the UAV may have one or more directional microphones that the UAV may be able to physically move in order to determine a direction from which the audio is coming.

Additionally, at block 504, the processor may use a classification to detect motor failures of the UAV. When the UAV is operating, the motors of the UAV may produce sound that the microphones of the UAV may receive. When the classifier classifies the audio signal, it may compare the received audio with audio of the motors when they are operating correctly. By classifying the received audio based on known sounds of the motors, two results may be achieved. First, the audio of motors may be removed from the received audio signals. Second, the classification may be used to determine if a motor is failing. In some examples, as a motor starts to fail, it may make a different and/or unknown sound. Therefore, by predicating a motor failure, a UAV may be repaired or taken out of service before the motor fails.

In yet some further examples, at block 504, the processor may use sensor fusion to aid in the detection of other aircraft. By using sensor fusion, the UAV may more accurately determine the presence of other aircraft. In some examples, a sensor fusion algorithm may be used in order to reduce power usage of the UAV. Power usage of the UAV may be reduced by way of keeping some sensors powered down until a first sensor provides an indication that another sensor should be powered on. In some examples, the UAV may have a camera or other optical imaging, and/or RADAR or other radio-based imaging. The UAV may be able to keep the camera and/or RADAR powered off until the classifier detects the presence of another aircraft.

In practice, a processor may detect the presence of another aircraft based on a received audio signal. Upon detecting the aircraft, the camera and/or RADAR may be powered on to more specifically detect the aircraft. In some examples, the processor may determine a range and type of aircraft producing the sound. This information may be used to image the other aircraft by way of the camera and/or RADAR.

In other examples, sensor fusion may be used to disable the audio system until some other sensor indicates that there could potentially be another aircraft near by. In response to the other sensors indicating a potential aircraft, the audio system may be powered on and start receiving audio signals in order to detect the presence of another aircraft.

At block 506, the method includes "based on the determination, performing at least one maneuver of the aerial vehicle." Based on determining that another aircraft is present, the control system of the UAV may perform at least one maneuver of the aerial vehicle. In some examples, the at least one maneuver may be a predetermined maneuver. The predetermined maneuver may be landing the UAV and/or adjusting an altitude of the UAV. In other examples, the at least one maneuver may be based on information related to the other aircraft. For example, the UAV may determine movement parameters of the other aircraft and perform a maneuver to avoid the other aircraft. In various embodiments, maneuvers may include landing the UAV, adjusting an altitude of the UAV, laterally moving the UAV, adjusting a roll, pitch, or yaw of the UAV. In some examples the maneuver may be more than one operation of the UAV.

V. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A method, performed during a flight of an aerial vehicle, comprising:
   receiving an audio signal from at least one microphone of a plurality of microphones of the aerial vehicle, wherein the audio signal includes sounds created by the flight of the aerial vehicle and sounds created by an aircraft located near the aerial vehicle;
   processing the audio signal to remove a portion of the received audio signal that corresponds to the sounds created by the flight of the aerial vehicle to generate a filtered audio signal that includes the sounds created by the aircraft located near the aerial vehicle;
   determining, based at least in part on the filtered audio signal, at least one of a distance and type of aircraft located near the aerial vehicle; and
   based on the determination, performing at least one maneuver of the aerial vehicle.

2. The method of claim 1, wherein the plurality of microphones includes at least one microphone that is directional and at least one microphone that is not directional.

3. The method of claim 1, wherein each microphone of the plurality of microphones receives sound from a respective region, and wherein the regions are not symmetric.

4. The method of claim 1, further comprising:
   calculating a score for the received audio signal based on a classification profile,
   wherein determining at least one of the distance and type of aircraft located near the aerial vehicle comprises determining the type of aircraft located near the vehicle based at least in part on the filtered audio signal and the calculated score.

5. The method of claim 4, further comprising:
   capturing a short length audio sample of the received audio signal; and
   capturing a long length audio sample of the received audio signal,
   wherein calculating the score for the received audio signal based on the classification profile comprises: (i) if in a first environment, calculating the score based on the short length audio sample, and (ii) if in a second environment, calculating the score based on the long length audio sample, where the second environment has a lower signal/noise ration than the first environment.

6. The method of claim 4, further comprising:
capturing and storing an audio sample of the received audio signal, wherein calculating the score for the received audio signal based on the classification profile comprises operating on the stored audio sample; and
deleting the audio sample after calculating the score.

7. The method of claim 4, wherein calculating the score for the received audio signal based on the classification profile comprises:
capturing an audio sample of the received audio signal;
calculating a frequency spectral energy concentration of the audio sample; and
calculating the score based at least in part on the calculated frequency spectral energy concentration.

8. The method of claim 4, wherein calculating the score for the received audio signal based on the classification profile comprises:
capturing an audio sample of the received audio signal;
determining a frequency spectral energy concentration of the audio sample;
determining a monotonicity of the audio sample; and
calculating the score based at least in part on the determined frequency spectral energy concentration and the determined monotonicity.

9. The method of claim 1, further comprising:
determining an amplitude of the received audio signal, wherein determining at least one of the distance and type of aircraft located near the aerial vehicle comprises determining the distance of the aircraft located near the vehicle based at least in part on the determined amplitude.

10. The method of claim 9, wherein determining the amplitude of the received audio signal comprises determining an absolute amplitude of the received audio signal.

11. The method of claim 9, wherein determining the amplitude of the received audio signal comprises determining an amplitude ratio of the received audio signal from multiple microphones in the plurality of microphones.

12. The method of claim 11, wherein the multiple microphones include at least one microphone that is directional and at least one microphone that is not directional.

13. A method, performed during a flight of an aerial vehicle, comprising:
processing a first signal from a first sensor type;
determining from the processed signal the potential presence of another aircraft;
activating a second sensor type, wherein the second sensor type is at least one microphone of a plurality of microphones of the aerial vehicle, and wherein the first sensor type is not a microphone;
receiving an audio signal from the second sensor type, wherein the audio signal includes sounds created by the flight of the aerial vehicle and sounds created by an aircraft located near the aerial vehicle;
processing the audio signal from the second sensor type, wherein processing the audio signal from the second sensor type comprises removing a portion of the received audio signal that corresponds to the sounds created by the flight of the aerial vehicle to generate a filtered audio signal;
determining, based at least in part on the processed audio signal, at least one of a distance and type of aircraft located near the aerial vehicle; and
based on the determination of at least one of the distance and type of aircraft located near the aerial vehicle, performing at least one maneuver of the aerial vehicle.

14. The method of claim 13, wherein activating the second sensor type comprises turning on the second sensor type.

15. The method of claim 13, wherein the first sensor type is an optical imaging system.

16. The method of claim 13, wherein the first sensor type is a radar system.

17. The method of claim 13, wherein the first sensor type is a microphone.

* * * * *